(12) United States Patent
Deevi et al.

(10) Patent No.: US 9,107,452 B2
(45) Date of Patent: *Aug. 18, 2015

(54) CATALYST TO REDUCE CARBON MONOXIDE IN THE MAINSTREAM SMOKE OF A CIGARETTE

(75) Inventors: Sarojini Deevi, Midlothian, VA (US); Kent B. Koller, Chesterfield, VA (US)

(73) Assignee: PHILIP MORRIS USA INC., Richmond, VA (US)

( * ) Notice: Subject to any disclaimer, the term of this patent is extended or adjusted under 35 U.S.C. 154(b) by 769 days.

This patent is subject to a terminal disclaimer.

(21) Appl. No.: 10/460,631

(22) Filed: Jun. 13, 2003

(65) Prior Publication Data

US 2004/0250827 A1 Dec. 16, 2004

(51) Int. Cl.
| | | |
|---|---|---|
| *B01J 37/03* | (2006.01) | |
| *A24B 15/28* | (2006.01) | |
| *B01J 37/02* | (2006.01) | |
| *A24D 3/16* | (2006.01) | |

(52) U.S. Cl.
CPC .............. *A24B 15/286* (2013.01); *A24B 15/28* (2013.01); *A24B 15/282* (2013.01); *A24B 15/287* (2013.01); *A24D 3/16* (2013.01); *B01J 37/0201* (2013.01); *B01J 37/0213* (2013.01); *B01J 37/03* (2013.01); *B01J 37/035* (2013.01)

(58) Field of Classification Search
USPC ......................................... 131/364, 334, 360
See application file for complete search history.

(56) References Cited

U.S. PATENT DOCUMENTS

| | | | |
|---|---|---|---|
| 2,838,444 A * | 6/1958 | Gring et al. ................... | 208/138 |
| 3,013,987 A * | 12/1961 | Castor et al. .................... | 502/61 |
| 3,230,034 A * | 1/1966 | Stiles .......................... | 423/213.2 |
| 3,292,636 A * | 12/1966 | Mays ............................. | 131/352 |
| 3,720,214 A | 3/1973 | Norman et al. | |
| 3,734,950 A * | 5/1973 | Scharfe et al. ................ | 560/183 |
| 3,807,416 A | 4/1974 | Hedge et al. | |
| 3,840,472 A * | 10/1974 | Colgan et al. ................. | 502/174 |
| 3,931,824 A | 1/1976 | Miano et al. | |

(Continued)

FOREIGN PATENT DOCUMENTS

| | | |
|---|---|---|
| EP | 0499402 A1 | 8/1992 |
| GB | 1204353 A | 9/1970 |

(Continued)

OTHER PUBLICATIONS

Wikipedia contributors, "Colloid," Wikipedia, The Free Encyclopedia, http://en.wikipedia.org/w/index.php?title=Colloid&oldid=252482920 (accessed Nov. 18, 2008).*

Aruna, et al., "Nanosize rutile titania particle synthesis via a hydrothermal method without mineralizers," J. Mater. Chem., 2000, vol. 10, pp. 23888-2391.*

(Continued)

*Primary Examiner* — Michael J Felton
(74) *Attorney, Agent, or Firm* — Buchanan, Ingersoll & Rooney PC

(57) ABSTRACT

Cut filler compositions, cigarette paper, cigarette filters, cigarettes, methods for making cigarettes and methods for smoking cigarettes are provided, which involve the use of a catalyst capable converting carbon monoxide to carbon dioxide. The catalyst comprises nanoscale metal and/or metal oxide particles supported on high surface area support particles. The catalyst can be prepared by combining a metal precursor solution with high surface area support particles to form a mixture, or by combining a metal precursor solution with a colloidal solution to form a mixture, and then heat treating the mixture.

23 Claims, 8 Drawing Sheets

(56) References Cited

U.S. PATENT DOCUMENTS

| | | | |
|---|---|---|---|
| 4,039,476 A * | 8/1977 | Bertus et al. | 502/211 |
| 4,107,225 A * | 8/1978 | Debande et al. | 585/277 |
| 4,108,151 A | 8/1978 | Martin | |
| 4,109,663 A | 8/1978 | Maeda et al. | |
| 4,119,104 A | 10/1978 | Roth | |
| 4,140,654 A * | 2/1979 | Yoshioka et al. | 502/63 |
| 4,182,348 A | 1/1980 | Seehofer et al. | |
| 4,195,645 A | 4/1980 | Bradley et al. | |
| 4,197,861 A | 4/1980 | Keith | |
| 4,199,104 A | 4/1980 | Houben | |
| 4,256,609 A | 3/1981 | Dale et al. | |
| 4,265,255 A * | 5/1981 | Helms | 131/69 |
| 4,301,035 A | 11/1981 | Risse | |
| 4,317,460 A | 3/1982 | Dale et al. | |
| 4,368,029 A | 1/1983 | Lacroix | |
| 4,450,245 A | 5/1984 | Carlisle et al. | |
| 4,450,847 A | 5/1984 | Owens | |
| 4,453,553 A | 6/1984 | Cohn | |
| 4,463,030 A | 7/1984 | Deffeyes et al. | |
| 4,489,739 A | 12/1984 | Mattina et al. | |
| 4,524,051 A | 6/1985 | Sampson et al. | |
| 4,598,719 A * | 7/1986 | Mattei et al. | 131/84.1 |
| 4,639,432 A * | 1/1987 | Holt et al. | 502/324 |
| 4,744,374 A | 5/1988 | Deffeves et al. | |
| 4,763,674 A | 8/1988 | Lelah | |
| 4,855,274 A | 8/1989 | Upchurch et al. | |
| 4,875,910 A | 10/1989 | Dunnigan et al. | |
| 4,940,686 A | 7/1990 | Tooley et al. | |
| 4,956,330 A | 9/1990 | Elliott et al. | |
| 4,957,710 A | 9/1990 | Nagai et al. | |
| 4,973,569 A * | 11/1990 | Bowman et al. | 502/209 |
| 4,991,181 A | 2/1991 | Upchurch et al. | |
| 5,017,357 A * | 5/1991 | Kolts et al. | 423/437.2 |
| 5,040,551 A | 8/1991 | Schlatter et al. | |
| 5,050,621 A | 9/1991 | Creighton et al. | |
| 5,082,977 A * | 1/1992 | Chaung | 568/454 |
| 5,101,839 A | 4/1992 | Jakob et al. | |
| 5,105,836 A | 4/1992 | Gentry et al. | |
| 5,129,408 A | 7/1992 | Jakob et al. | |
| 5,211,684 A | 5/1993 | Shannon et al. | |
| 5,258,340 A | 11/1993 | Augustine et al. | |
| 5,281,447 A | 1/1994 | Brady et al. | |
| 5,284,166 A | 2/1994 | Cartwright et al. | |
| 5,292,594 A | 3/1994 | Liburdi et al. | |
| 5,321,105 A * | 6/1994 | Rekers et al. | 526/104 |
| 5,322,075 A | 6/1994 | Deevi et al. | |
| 5,386,838 A | 2/1995 | Quincy et al. | |
| 5,388,177 A | 2/1995 | Ono et al. | |
| 5,425,383 A * | 6/1995 | Garthaffner et al. | 131/94 |
| 5,446,003 A | 8/1995 | Augustine et al. | |
| 5,462,903 A | 10/1995 | Rousset et al. | |
| 5,494,704 A | 2/1996 | Ackerman | |
| 5,503,874 A | 4/1996 | Ackerman et al. | |
| 5,585,020 A | 12/1996 | Becker et al. | |
| 5,591,368 A | 1/1997 | Fleischhauer et al. | |
| 5,598,868 A | 2/1997 | Jakob et al. | |
| 5,643,508 A * | 7/1997 | Ganguly et al. | 264/29.6 |
| 5,671,758 A * | 9/1997 | Rongved | 131/334 |
| 5,702,836 A | 12/1997 | Ma et al. | |
| 5,728,462 A | 3/1998 | Arino et al. | |
| 5,731,257 A | 3/1998 | Qunicy, III et al. | |
| 5,766,562 A | 6/1998 | Chattha et al. | |
| 5,789,337 A * | 8/1998 | Haruta et al. | 502/344 |
| 5,850,047 A | 12/1998 | Tani et al. | |
| 5,865,959 A | 2/1999 | Meinzer et al. | |
| 5,883,041 A * | 3/1999 | Pak et al. | 502/524 |
| 5,934,289 A | 8/1999 | Watkins et al. | |
| 5,965,267 A | 10/1999 | Nola et al. | |
| 6,053,176 A | 4/2000 | Adams et al. | |
| 6,074,979 A | 6/2000 | Hagemeyer et al. | |
| 6,083,467 A | 7/2000 | Takeshima et al. | |
| 6,095,152 A | 8/2000 | Beven et al. | |
| 6,099,819 A * | 8/2000 | Srinivas et al. | 423/573.1 |
| 6,132,694 A | 10/2000 | Wood et al. | |
| 6,138,684 A | 10/2000 | Yamazaki et al. | |
| 6,221,440 B1 | 4/2001 | Meyer et al. | |
| 6,235,677 B1 | 5/2001 | Manzer et al. | |
| 6,251,339 B1 | 6/2001 | Beane et al. | |
| 6,262,129 B1 | 7/2001 | Murray et al. | |
| 6,265,341 B1 | 7/2001 | Komatsu et al. | |
| 6,276,132 B1 | 8/2001 | Kanesaka et al. | |
| 6,286,516 B1 | 9/2001 | Bowen et al. | |
| 6,299,778 B1 | 10/2001 | Penth et al. | |
| 6,315,870 B1 | 11/2001 | Tabatabaie-Raissi et al. | |
| 6,316,377 B1 | 11/2001 | Fulton et al. | |
| 6,346,136 B1 | 2/2002 | Chen et al. | |
| 6,348,431 B1 | 2/2002 | Even | |
| 6,353,037 B1 | 3/2002 | Thunhorst et al. | |
| 6,371,127 B1 | 4/2002 | Snaidr et al. | |
| 6,391,818 B1 | 5/2002 | Bönsel et al. | |
| 6,391,821 B1 | 5/2002 | Satoh et al. | |
| 6,399,528 B1 * | 6/2002 | Krell et al. | 501/80 |
| 6,410,765 B1 | 6/2002 | Wellinghoff et al. | |
| 6,782,892 B2 * | 8/2004 | Li et al. | 131/364 |
| 6,857,431 B2 * | 2/2005 | Deevi et al. | 131/334 |
| 2002/0002979 A1 | 1/2002 | Bowen et al. | |
| 2002/0037792 A1 | 3/2002 | Smith | |
| 2002/0062384 A1 | 5/2002 | Tso | |
| 2003/0000538 A1 | 1/2003 | Bereman | |
| 2003/0064887 A1 * | 4/2003 | Korotkikh et al. | 502/329 |
| 2003/0075193 A1 * | 4/2003 | Li et al. | 131/364 |
| 2003/0131859 A1 * | 7/2003 | Li et al. | 131/364 |
| 2004/0025895 A1 * | 2/2004 | Li et al. | 131/364 |
| 2004/0173229 A1 * | 9/2004 | Crooks et al. | 131/359 |

FOREIGN PATENT DOCUMENTS

| | | | | |
|---|---|---|---|---|
| GB | 2013476 A | | 8/1979 | |
| JP | 09140370 A | * | 6/1997 | A24D 1/00 |
| JP | 11-235169 A | | 8/1999 | |
| WO | WO 87/06104 | | 10/1987 | |
| WO | 98/51401 A1 | | 11/1998 | |
| WO | 99/16546 A1 | | 4/1999 | |
| WO | 99/21652 A2 | | 5/1999 | |
| WO | 00/09259 A2 | | 2/2000 | |
| WO | WO 00/40104 | | 7/2000 | |
| WO | WO 02/24005 | | 3/2002 | |
| WO | WO02/37990 | * | 5/2002 | |
| WO | WO03/020058 A | | 3/2003 | |
| WO | 03/086112 A | | 10/2003 | |

OTHER PUBLICATIONS

Mauritz, Kenneth A., et al., "Sol-Gel Chemistry", (no date), The University of Southern Mississippi, http://www.psrc.usm.edu/mauritz/mauritz.html accessed Jul. 3, 2009.*

E. Elaloui, et al., Thermostable yttria-doped inorganic oxide catalyst supports for high temperature reactions, Studies in Surface Science and Catalysis, Elsevier, 2000, vol. 143, pp. 331-335, ISSN 0167-2991, ISBN 9780444511782, DOI: 10.1016/S0167-2991(00)80672-2. (http://www.sciencedirect.com/science/article/pii/S0167299100806722).*

Application of Supported Gold Catalysts in Environmental Problems Tsubota, Susumu ; Ueda, Atsushi ; Sakurai, Hiroaki ; Kobayashi, Tetsuhiko ; Haruta, Masatake Environmental Catalysis. Feb. 23, 1994, 420-428.*

Li, et al., "Low-temperature water-gas shift reaction over Cu- and Ni-loaded cerium oxide catalyst," 2000, Applied Catalysis B, vol. 27, pp. 179-191.*

Reynolds, John H., "Use of Palladium ad Copper Oxide Impregnated Alumina to Remove CO from Cigarette Smoke", RJ Reynolds, Dec. 28, 1971. Accessed via: http://legacy.library.ucsf.edu/tid/wiu58d00.*

International Search Report and Written Opinion for PCT/IB2004/002188 dated Dec. 10, 2004.

International Preliminary Report on Patentability dated Dec. 13, 2005 for PCT/IB2004/002180.

Japanese Official Action issued Dec. 21, 2009 for Japanese Patent Appln. No. 2006-516590.

English translation of Japanese Official Action issued Dec. 21, 2009 for Japanese Patent Appln. No. 2006-516590.

* cited by examiner

CATALYST TO REDUCE CARBON MONOXIDE IN THE MAINSTREAM SMOKE OF A CIGARETTE

FIELD OF THE INVENTION

The invention relates generally to methods for reducing constituents such as carbon monoxide in the mainstream smoke of a cigarette during smoking. More specifically, the invention relates to cut filler compositions, cigarettes, methods for making cigarettes and methods for smoking cigarettes, which involve the use of nanoparticle additives capable of reducing the amounts of various constituents in tobacco smoke.

BACKGROUND OF THE INVENTION

In the description that follows reference is made to certain structures and methods, however, such references should not necessarily be construed as an admission that these structures and methods qualify as prior art under the applicable statutory provisions. Applicants reserve the right to demonstrate that any of the referenced subject matter does not constitute prior art.

Smoking articles, such as cigarettes or cigars, produce both mainstream smoke during a puff and sidestream smoke during static burning. One constituent of both mainstream smoke and sidestream smoke is carbon monoxide (CO). The reduction of carbon monoxide in smoke is desirable.

Catalysts, sorbents, and/or oxidants for smoking articles are disclosed in the following: U.S. Pat. No. 6,371,127 issued to Snider et al., U.S. Pat. No. 6,286,516 issued to Bowen et al., U.S. Pat. No. 6,138,684 issued to Yamazaki et al., U.S. Pat. No. 5,671,758 issued to Rongved, U.S. Pat. No. 5,386,838 issued to Quincy, III et al., U.S. Pat. No. 5,211,684 issued to Shannon et al., U.S. Pat. No. 4,744,374 issued to Deffeves et al., U.S. Pat. No. 4,453,553 issued to Cohn, U.S. Pat. No. 4,450,847 issued to Owens, U.S. Pat. No. 4,182,348 issued to Seehofer et al., U.S. Pat. No. 4,108,151 issued to Martin et al., U.S. Pat. No. 3,807,416, and U.S. Pat. No. 3,720,214. Published applications WO 02/24005, WO 87/06104, WO 00/40104 and U.S. patent application Publication Nos. 2002/0002979 A1, 2003/0037792 A1 and 2002/0062834 A1 also refer to catalysts, sorbents, and/or oxidants.

Iron and/or iron oxide has been described for use in tobacco products (see e.g., U.S. Pat. Nos. 4,197,861; 4,489,739 and 5,728,462). Iron oxide has been described as a coloring agent (e.g. U.S. Pat. Nos. 4,119,104; 4,195,645; 5,284,166) and as a burn regulator (e.g. U.S. Pat. Nos. 3,931,824; 4,109,663 and 4,195,645) and has been used to improve taste, color and/or appearance (e.g. U.S. Pat. Nos. 6,095,152; 5,598,868; 5,129,408; 5,105,836 and 5,101,839).

Despite the developments to date, there remains a need for improved and more efficient methods and compositions for reducing the amount of carbon monoxide in the mainstream smoke of a smoking article during smoking.

SUMMARY

Tobacco cut filler compositions, cigarette paper, cigarette filters, cigarettes, methods for making cigarettes and methods for smoking cigarettes are provided with catalysts for the conversion of carbon monoxide to carbon dioxide.

One embodiment provides a tobacco cut filler composition comprising tobacco and a catalyst for the conversion of carbon monoxide to carbon dioxide, wherein the catalyst comprises nanoscale metal particles and/or nanoscale metal oxide particles supported on high surface area support particles.

Another embodiment provides a cigarette comprising tobacco cut filler, wherein the cut filler comprises a catalyst capable of converting carbon monoxide to carbon dioxide, wherein the catalyst comprises nanoscale metal particles and/or nanoscale metal oxide particles supported on high surface area support particles. Optionally the cigarette can further comprise a filter wherein the catalyst is dispersed on and/or within the filter material. A still further embodiment provides a cigarette filter that comprises a catalyst capable of converting carbon monoxide to carbon dioxide, wherein the catalyst comprises nanoscale metal particles and/or nanoscale metal oxide particles supported on high surface area support particles.

Cigarettes produced according to the invention preferably comprise up to about 200 mg of the catalyst per cigarette, and more preferably from about 10 mg to about 100 mg of the catalyst per cigarette. The catalyst is preferably formed prior to the smoking of the cigarette.

A further embodiment provides a method of making a cigarette, comprising (i) adding a catalyst to a tobacco cut filler, wherein the catalyst comprises nanoscale metal particles and/or nanoscale metal oxide particles supported on high surface area support particles; (ii) providing the cut filler to a cigarette making machine to form a tobacco rod; and (iii) placing a paper wrapper around the tobacco rod to form the cigarette.

In a preferred embodiment the nanoscale metal particles and/or metal oxide particles comprise Group IIIB and Group IVB metals and metalloids, high melting point metals, and transition, refractory, rare earth and precious metals, e.g., B, Mg, Al, Si, Ti, Fe, Co, Ni, Cu, Zn, Ge, Zr, Nb, Mo, Ru, Rh, Pd, Ag, Sn, Ce, Hf, Ta, W, Re, Os, Ir, Pt, Au and mixtures thereof, and the high surface area support particles comprise silica gel beads, activated carbon, molecular sieves, magnesia, alumina, silica, titania, zirconia, iron oxide, cobalt oxide, nickel oxide, copper oxide, yttria optionally doped with zirconium, manganese oxide optionally doped with palladium, ceria and mixtures thereof.

According to another preferred embodiment, the nanoscale metal particles and/or nanoscale metal oxide particles comprise Cu, Zn, Co, Fe and/or Au and the high surface area support particles comprise silica gel beads, iron oxide and/or activated carbon in an amount effective to convert at least about 10%, preferably at least about 25% of the carbon monoxide to carbon dioxide. For example, the catalyst can comprise from about 0.1 to 25 wt. % Cu, Zn, Co and/or Fe nanoscale particles supported on high surface area support particles.

According to one method, a cigarette is manufactured by combining a metal precursor and a solvent to form a metal precursor solution, combining the metal precursor solution with high surface area support particles to form a mixture, heating the mixture to a temperature sufficient to thermally decompose the metal precursor to form nanoscale particles within and/or on the high surface area support particles, and drying the mixture. Optionally, a dispersion of nanoscale particles can be added to the metal precursor solution.

The nanoscale particles can have an average particle size less than about 100 nm, preferably less than about 50 nm, more preferably less than about 10 nm, and most preferably less than about 7 nm. Nanoscale particles may also contain carbon from partial decomposition of the organic or inorganic components present in the metal precursor and/or solvent. Preferably the nanoscale particles are substantially carbon free. The nanoscale metal particles and/or nanoscale metal oxide particles can comprise magnetic particles. The high surface area support particles preferably have a surface area of about 20 to 2500 m²/g and can comprise millimeter, micron, submicron and/or nanoscale particles.

According to a further method, the metal precursor is one or more of β-diketonates, dionates, oxalates and hydroxides and the metal comprises at least one element selected from B, Mg, Al, Si, Ti, Fe, Co, Ni, Cu, Zn, Ge, Zr, Nb, Mo, Ru, Rh, Pd, Ag, Sn, Ce, Hf, Ta, W, Re, Os, Ir, Pt and Au. The solvent can comprise at least one of distilled water, methyl alcohol, ethyl alcohol, chloroform, aldehydes, ketones, aromatic hydrocarbons and mixtures thereof. Preferably, the mixture is heated to a temperature of from about 200 to 400° C. The nanoscale particles are preferably deposited within cavities, pores and/or on the surface of the high surface area support particles. The size of the pores in the high surface area support can be less than about 50 nm.

The high surface area support particles can be derived from a colloidal solution and can comprise magnesia, alumina, silica, titania, yttria, zirconia and/or ceria where the concentration of colloids in the colloidal solution can be from about 10 to 60 weight percent. The viscosity of the colloidal solution can be increased by changing the pH of the colloidal solution. The step of increasing the viscosity of the colloidal solution can comprise adding a dilute acid or a dilute base to the colloidal solution. The dilute acid can comprise HCl. According to a preferred method, the viscosity of the colloidal solution is increased to form a gel before the step of heating the mixture. Preferably the gel is washed. The step of drying the mixture can comprise air-drying.

Yet another embodiment provides a method of smoking the cigarette described above, which involves lighting the cigarette to form smoke and drawing the smoke through the cigarette, wherein during the smoking of the cigarette, the catalyst converts carbon monoxide to carbon dioxide.

DETAILED DESCRIPTION

Figure 1:
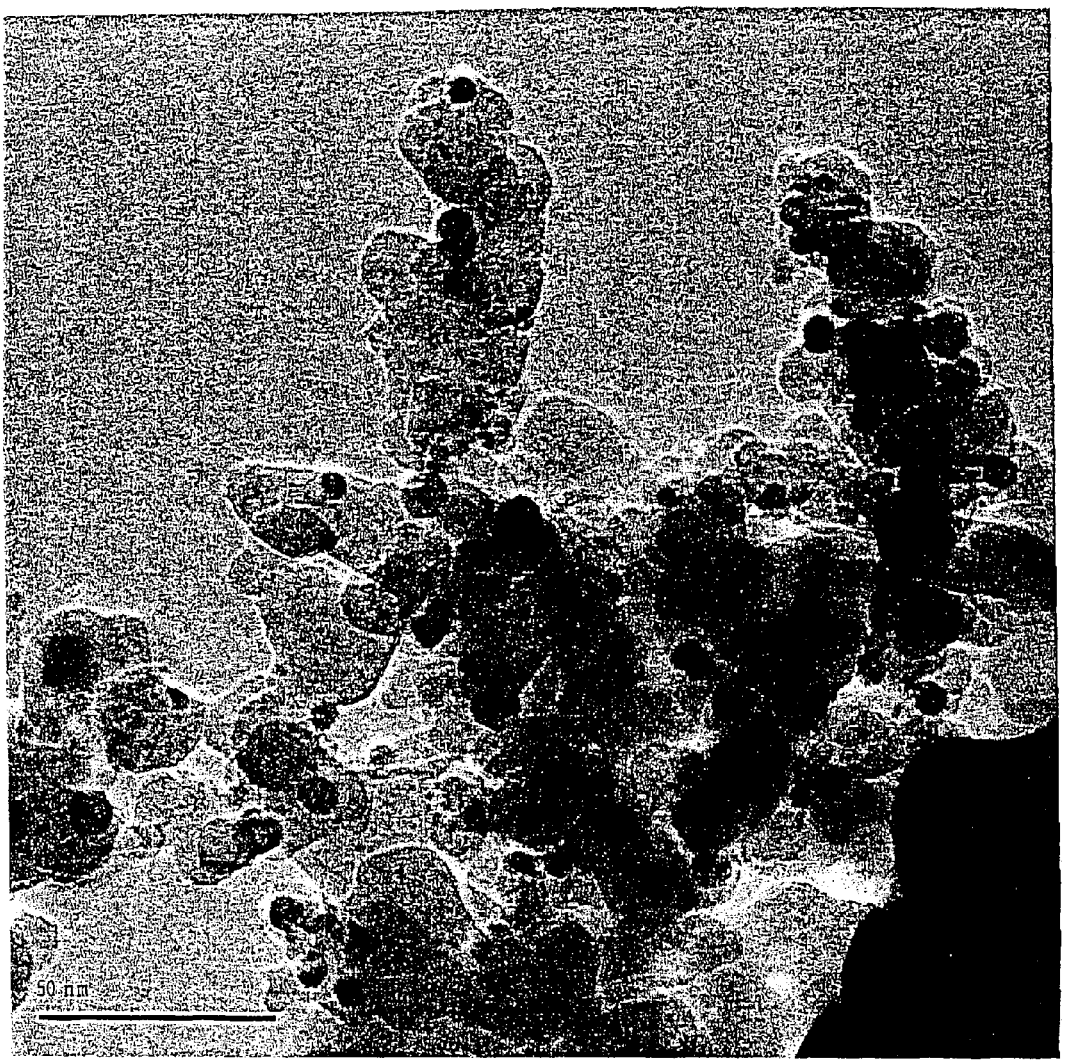
FIGS. 1-4 show TEM images of a catalyst prepared according to an embodiment wherein nanoscale gold particles are deposited on iron oxide support particles.
Figure 2:
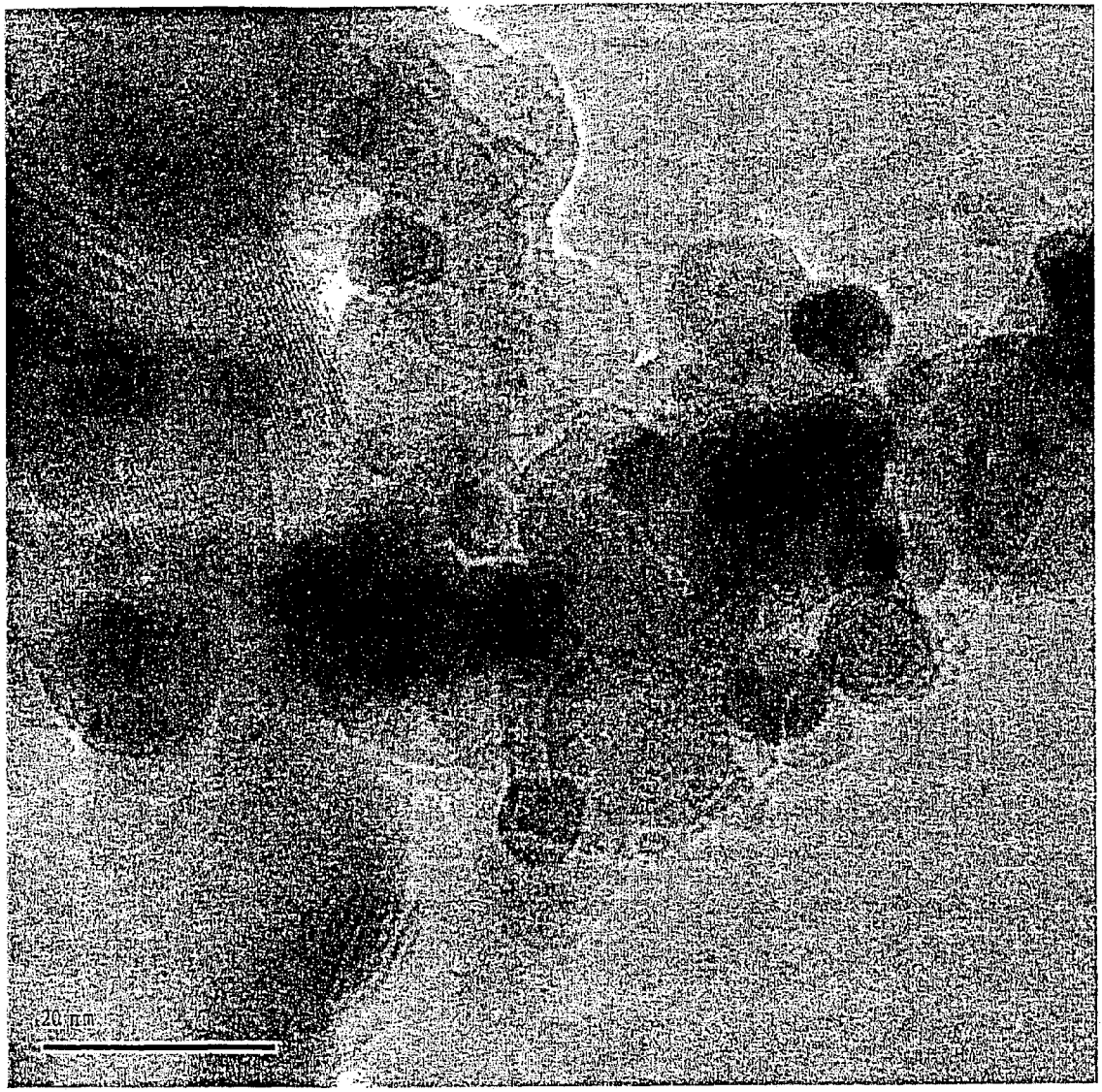
Figure 3:
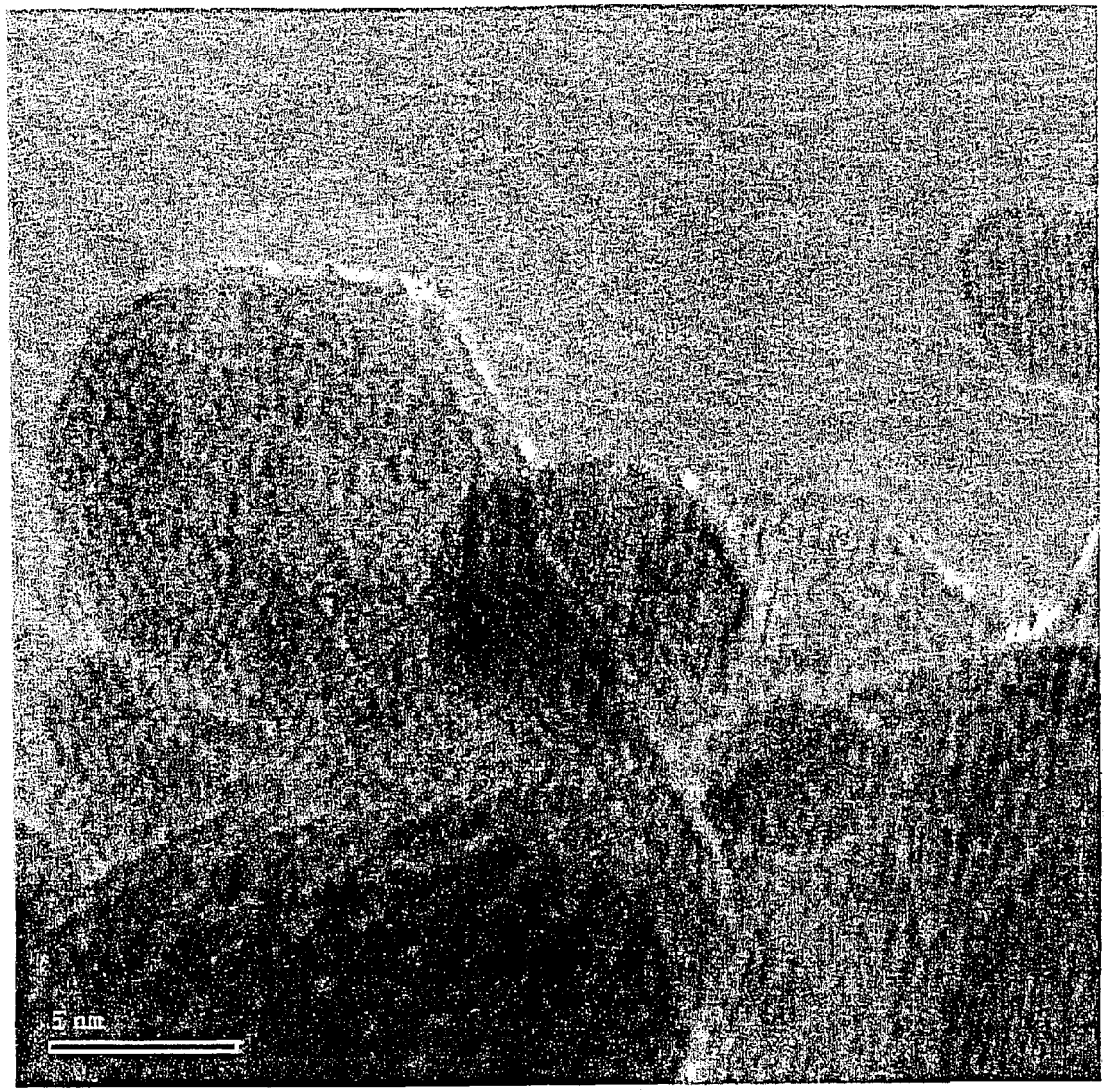
Figure 4:
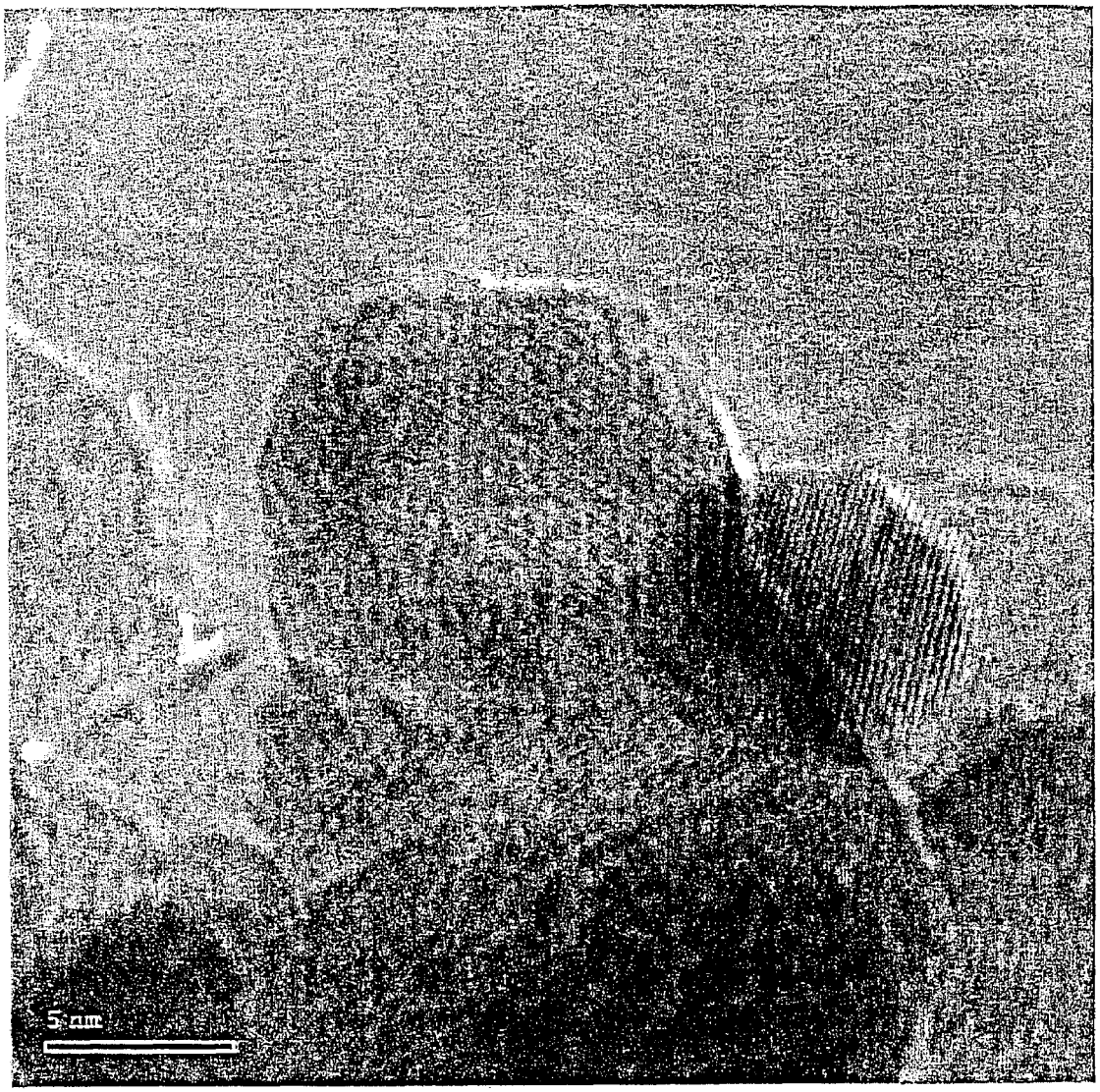

Tobacco cut filler compositions, cigarette paper, cigarette filter material, cigarettes, methods for making cigarettes and methods for smoking cigarettes are provided which use catalysts having nanoscale metal particles and/or nanoscale metal oxide particles on high surface area support particles capable of converting carbon monoxide to carbon dioxide.

"Smoking" of a cigarette means the heating or combustion of the cigarette to form smoke, which can be drawn through the cigarette. Generally, smoking of a cigarette involves lighting one end of the cigarette and, while the tobacco contained therein undergoes a combustion reaction, drawing the cigarette smoke through the mouth end of the cigarette. The cigarette may also be smoked by other means. For example, the cigarette may be smoked by heating the cigarette and/or heating using electrical heater means, as described in commonly-assigned U.S. Pat. Nos. 6,053,176; 5,934,289; 5,591,368 or 5,322,075.

The term "mainstream" smoke refers to the mixture of gases passing down the tobacco rod and issuing through the filter end, i.e., the amount of smoke issuing or drawn from the mouth end of a cigarette during smoking of the cigarette.

In addition to the constituents in the tobacco, the temperature and the oxygen concentration are factors affecting the formation and reaction of carbon monoxide and carbon dioxide. The total amount of carbon monoxide formed during smoking comes from a combination of three main sources: thermal decomposition (about 30%), combustion (about 36%) and reduction of carbon dioxide with carbonized tobacco (at least 23%). Formation of carbon monoxide from thermal decomposition, which is largely controlled by chemical kinetics, starts at a temperature of about 180° C. and finishes at about 1050° C. Formation of carbon monoxide and carbon dioxide during combustion is controlled largely by the diffusion of oxygen to the surface (ka) and via a surface reaction (kb). At 250° C., ka and kb, are about the same. At about 400° C., the reaction becomes diffusion controlled. Finally, the reduction of carbon dioxide with carbonized tobacco or charcoal occurs at temperatures around 390° C. and above.

During smoking there are three distinct regions in a cigarette: the combustion zone, the pyrolysis/distillation zone, and the condensation/filtration zone. While not wishing to be bound by theory, it is believed that catalysts having nanoscale metal particles and/or nanoscale metal oxide particles on high surface area support particles can target the various reactions that occur in different regions of the cigarette during smoking.

First, the combustion zone is the burning zone of the cigarette produced during smoking of the cigarette, usually at the lighted end of the cigarette. The temperature in the combustion zone ranges from about 700° C. to about 950° C., and the heating rate can be as high as 500° C./second. Because oxygen is being consumed in the combustion of tobacco to produce carbon monoxide, carbon dioxide, water vapor, and various organics, the concentration of oxygen is low in the combustion zone. The low oxygen concentrations coupled with the high temperature leads to the reduction of carbon dioxide to carbon monoxide by the carbonized tobacco. In this region, the catalyst can convert carbon monoxide to carbon dioxide via both catalysis and oxidation mechanisms. The combustion zone is highly exothermic and the heat generated is carried to the pyrolysis/distillation zone.

The pyrolysis zone is the region behind the combustion zone, where the temperatures range from about 200° C. to about 600° C. The pyrolysis zone is where most of the carbon monoxide is produced. The major reaction is the pyrolysis (i.e., thermal degradation) of the tobacco that produces carbon monoxide, carbon dioxide, smoke components, charcoal and/or carbon using the heat generated in the combustion zone. There is some oxygen present in this region, and thus the catalyst may act as an oxidation catalyst for the oxidation of carbon monoxide to carbon dioxide. The catalytic reaction begins at 150° C. and reaches maximum activity around 300° C.

In the condensation/filtration zone the temperature ranges from ambient to about 150° C. The major process in this zone is the condensation/filtration of the smoke components. Some amount of carbon monoxide and carbon dioxide diffuse out of the cigarette and some oxygen diffuses into the cigarette. The partial pressure of oxygen in the condensation/filtration zone does not generally recover to the atmospheric level.

The catalyst comprises metal and/or metal oxide nanoscale particles supported on high surface area support particles. The high surface area support particles can comprise porous granules and beads, which may or may not comprise interconnected passages that extend from one surface of the support to another. In addition, the high surface area support particles can comprise nanoscale particles. The high surface area support preferably comprises particles having a surface area greater than about 20, preferably greater than about 50 $m^2/g$. The support may be a catalytically active support.

Nanoscale particles are a class of materials whose distinguishing feature is that their average diameter, particle or other structural domain size is below about 100 nanometers. The nanoscale particles can have an average particle size less than about 100 nm, preferably less than about 50 nm, more preferably less than about 10 nm, and most preferably less than about 7 nm. Nanoscale particles have very high surface area to volume ratios, which makes them attractive for catalytic applications.

The synergistic combination of catalytically active nanoscale particles with a catalytically active high surface area support can produce a more efficient catalyst. Thus, nanoscale particles disposed on a high surface area support advantageously allow for the use of small quantities of material to catalyze, for example, the oxidation of CO to $CO_2$.

The catalyst comprises metal and/or metal oxide particles and a high surface area support. The support can comprise inorganic oxide particles such as silica gel beads, molecular sieves, magnesia, alumina, silica, titania, zirconia, iron oxide, cobalt oxide, nickel oxide, copper oxide, yttria optionally doped with zirconium, manganese oxide optionally doped with palladium, ceria and mixtures thereof. Also, the support can comprise activated carbon particles, such as PICA carbon (PICA carbon, Levallois, France). The supports are preferably characterized by a BET surface area greater than about 50 $m^2/g$, e.g., 100 $m^2/g$ to 2,500 $m^2/g$, with pores having a pore size greater than about 3 Angstroms, e.g., 10 Angstroms to 10 microns.

An example of a non-porous, high surface area support is nanoscale iron oxide particles. For instance, MACH I, Inc., King of Prussia, Pa. sells $Fe_2O_3$ nanoscale particles under the trade names NANOCAT® Superfine Iron Oxide (SFIO) and NANOCAT® Magnetic Iron Oxide. The NANOCAT® Superfine Iron Oxide (SFIO) is amorphous ferric oxide in the form of a free flowing powder, with a particle size of about 3 nm, a specific surface area of about 250 $m^2/g$, and a bulk density of about 0.05 g/ml. The NANOCAT® Superfine Iron Oxide (SFIO) is synthesized by a vapor-phase process, which renders it free of impurities that may be present in conventional catalysts, and is suitable for use in food, drugs, and cosmetics. The NANOCAT® Magnetic Iron Oxide is a free flowing powder with a particle size of about 25 nm and a surface area of about 40 $m^2/g$. According to a preferred embodiment, nanoscale metal particles, e.g., noble metal particles such as gold, can be supported on high surface area iron oxide particles.

An example of a porous, high surface area support is silica gel beads. Fuji-Silysia (Nakamura-ka, Japan) sells silica gel beads that range in size from about 5 to 30 microns and have a range of average pore diameters of from about 2.5 nm to 100 nm. The surface area of the silica gel beads ranges from about 30-800 $m^2/g$.

Exemplary classes of porous ceramic materials that can be used as a high surface area support include molecular sieves such as zeolites, microporous aluminum phosphates, silicoaluminum phosphates, silicoferrates, silicoborates, silicotitanates, magnesiumaluminate spinels and zinc aluminates.

According to a preferred method, both nanoscale particles and a high surface area support can be formed in situ upon heating a mixture of suitable metal precursor compounds. For example, a metal precursor such as gold hydroxide, silver pentane dionate, copper (II) pentane dionate, copper oxalate-zinc oxalate, or iron pentane dionate can be dissolved in a suitable solvent such as alcohol and mixed with a second metal precursor such as titanium pentane dionate. The metal precursor mixture can be heated to a relatively low temperature, for example about 200-400° C., wherein thermal decomposition of the metal precursors results in the formation of nanoscale metal or metal oxide particles deposited on porous titania support particles that can range in size from about 100 nm to 500 nm.

Alternatively, nanoscale particles can be formed in situ upon heating a mixture of a suitable metal precursor compound and high surface area support. By way of example, metal precursor compounds such as gold hydroxide, silver pentane dionate, copper (II) pentane dionate, copper oxalate-zinc oxalate, or iron pentane dionate can be dissolved in a suitable solvent such as alcohol and mixed with a dispersion of a support material such as colloidal silica, which can be gelled in the presence of an acid or base and allowed to dry such as by drying in air. Acids and bases that can be used to gel the colloidal mixture include hydrochloric acid, acetic acid, formic acid, ammonium hydroxide and the like. When an acid containing chlorine is used to gel the colloidal mixture, preferably the gel is washed in de-ionized water in order to reduce the concentration of chloride ions in the gel. The colloidal support material can be any suitable concentration such as, for example, 10 to 60 wt. %, e.g., a 15 wt. % dispersion or a 40 wt. % dispersion. During or after gelation, the metal precursor-colloidal silica mixture can be heated to a relatively low temperature, for example 200-400° C., wherein thermal decomposition of the metal precursor results in the formation of nanoscale metal or metal oxide particles deposited on silica support particles. In place of colloidal silica, colloidal titania or a colloidal silica-titania mixture can be used as a support. Colloidal support particles can range in size from about 10 to 500 nm.

Silica hydrogel, also known as silica aquagel, is a silica gel formed in water. The pores of a silica hydrogel are filled with water. An xerogel is a hydrogel with the water removed. An aerogel is a type of xerogel from which the liquid has been removed in such a way as to minimize collapse or change in the structure as the water is removed.

Silica gel can be prepared by conventional means such as by mixing an aqueous solution of an alkali metal silicate (e.g., sodium silicate) with a strong acid such as nitric or sulfuric acid, the mixing being done under suitable conditions of agitation to form a clear silica sol which sets into a hydrogel. The resulting gel can be washed. The concentration of the $SiO_2$ in the hydrogel is usually in the range of between about 10 to 60 weight percent, and the pH of the gel can be from about 1 to 9.

Washing can be accomplished simply by immersing the newly formed hydrogel in a continuously moving stream of water which leaches out the undesirable salts, leaving essentially pure silica ($SiO_2$). The pH, temperature, and duration of the wash water can influence the physical properties of the silica particles, such as surface area and pore volume.

Molecular organic decomposition (MOD) can be used to prepare nanoscale particles. The MOD process starts with a metal precursor containing the desired metallic element dissolved in a suitable solvent. For example, the process can involve a single metal precursor bearing one or more metallic atoms or the process can involve multiple single metallic precursors that are combined in solution to form a solution mixture. As described above, MOD can be used to prepare nanoscale metal particles and/or nanoscale metal oxide particles, including the support particles.

The decomposition temperature of the metal precursor is the temperature at which the ligands substantially dissociate (or volatilize) from the metal atoms. During this process the bonds between the ligands and the metal atoms are broken such that the ligands are vaporized or otherwise separated from the metal. Preferably all of the ligand(s) decompose. However, nanoscale particles may also contain carbon obtained from partial decomposition of the organic or inorganic components present in the metal precursor and/or solvent. Preferably the nanoscale particles are substantially carbon free.

The metal precursors used in MOD processing preferably are high purity, non-toxic, and easy to handle and store (with long shelf lives). Desirable physical properties include solubility in solvent systems, compatibility with other precursors for multi-component synthesis, and volatility for low temperature processing.

Nanoscale particles can be obtained from mixtures of metal precursors or from single-source metal precursor molecules in which one or more metallic elements are chemically associated. The desired stoichiometry of the resultant particles can match the stoichiometry of the metal precursor solution.

An aspect of the MOD method for making a catalyst is that a commercially desirable stoichiometry can be obtained. For example, the desired atomic ratio in the catalyst can be achieved by selecting a metal precursor or mixture of metal precursors having a ratio of first metal atoms to second metal atoms that is equal to the desired atomic ratio.

The metal precursor compounds are preferably metal organic compounds, which have a central main group, transition, lanthanide, or actinide metal atom or atoms bonded to a bridging atom (e.g., N, O, P or S) that is in turn bonded to an organic radical. Examples of the main group metal atom include, but are not limited to B, Mg, Al, Si, Ti, Fe, Co, Ni, Cu, Zn, Ge, Zr, Nb, Mo, Ru, Rh, Pd, Ag, Sn, Ce, Hf, Ta, W, Re, Os, Ir, Pt and Au. Such compounds may include metal alkoxides, β-diketonates, carboxylates, oxalates, citrates, metal hydrides, thiolates, amides, nitrates, carbonates, cyanates, sulfates, bromides, chlorides, and hydrates thereof. The metal precursor can also be a so-called organometallic compound, wherein a central metal atom is bonded to one or more carbon atoms of an organic group. Aspects of processing with these metal precursors are discussed below.

Precursors for the synthesis of nanoscale oxides are molecules having pre-existing metal-oxygen bonds such as metal alkoxides $M(OR)_n$ or oxoalkoxides $MO(OR)_n$, R=saturated or unsaturated organic group, alkyl or aryl), β-diketonates $M(\beta\text{-diketonate})_n$ (β-diketonate=RCOCHCOR') and metal carboxylates $M(O_2CR)_n$. Metal alkoxides have both good solubility and volatility and are readily applicable to MOD processing. Generally, however, these compounds are highly hygroscopic and require storage under inert atmosphere. In contrast to silicon alkoxides, which are liquids and monomeric, the alkoxides based on most metals are solids. On the other hand, the high reactivity of the metal-alkoxide bond can make these metal precursor materials useful as starting compounds for a variety of heteroleptic species (i.e., species with different types of ligands) such as $M(OR)_{n-x}Z_x$ (Z=β-diketonate or $O_2CR$).

Metal alkoxides M(OR)N react easily with the protons of a large variety of molecules. This allows easy chemical modification and thus control of stoichiometry by using, for example, organic hydroxy compounds such as alcohols, silanols ($R_3SiOH$), glycols $OH(CH_2)_nOH$, carboxylic and hydroxycarboxylic acids, hydroxyl surfactants, etc.

Fluorinated alkoxides $M(OR_F)_n$ ($R_F$=$CH(CF_3)_2$, $C_6F_5$, . . . ) are readily soluble in organic solvents and less susceptible to hydrolysis than classical alkoxides. These materials can be used as precursors for fluorides, oxides or fluoride-doped oxides such as F-doped tin oxide, which can be used as metal oxide nanoscale particles and/or as a high surface area support.

Modification of metal alkoxides reduces the number of M-OR bonds available for hydrolysis and thus hydrolytic susceptibility. Thus, it is possible to control the solution chemistry in situ by using, for example, β-diketonates (e.g. acetylacetone) or carboxylic acids (e.g. acetic acid) as modifiers for, or in lieu of, the alkoxide.

Metal β-diketonates $[M(RCOCHCOR')_n]_m$ are attractive precursors for MOD processing because of their volatility and high solubility. Their volatility is governed largely by the bulk of the R and R' groups as well as the nature of the metal, which will determine the degree of association, m, represented in the formula above. Acetylacetonates (R=R'=$CH_3$) are advantageous because they can provide good yields.

Metal β-diketonates are prone to a chelating behavior that can lead to a decrease in the nuclearity of these precursors. These ligands can act as surface capping reagents and polymerization inhibitors. Thus, small particles can be obtained after hydrolysis of $M(OR)_{n-x}(\beta\text{-diketonate})_x$. Acetylacetone can, for instance, stabilize nanoscale colloids. Thus, metal β-diketonate precursors are preferred for preparing nanoscale particles.

Metal carboxylates such as acetates ($M(O_2CMe)_n$) are commercially available as hydrates, which can be rendered anhydrous by heating with acetic anhydride or with 2-methoxyethanol. Many metal carboxylates generally have poor solubility in organic solvents and, because carboxylate ligands act mostly as bridging-chelating ligands, readily form oligomers or polymers. However, 2-ethylhexanoates ($M(O_2CCHEt_nBu)_n$), which are the carboxylates with the smallest number of carbon atoms, are generally soluble in most organic solvents. A large number of carboxylate derivatives are available for aluminum. Nanoscale aluminum-oxygen macromolecules and clusters (alumoxanes) can be used as catalyst materials. For example, formate $Al(O_2CH)_3(H_2O)$ and carboxylate-alumoxanes $[AlO_x(OH)_y(O_2CR)_z]_m$ can be prepared from the inexpensive minerals gibsite or boehmite.

Multicomponent materials can be prepared from mixed metal (hetero-metallic) precursors or, alternatively, from a mixture of single metal (homo-metallic) precursors.

The use of multiple single-metal precursors has the advantage of flexibility in designing precursor rheology as well as product stoichiometry. Hetero-metallic precursors, on the other hand, may offer access to metal systems whose single metal precursors have undesirable solubility, volatility or compatibility.

Mixed-metal species can be obtained via Lewis acid-base reactions or substitution reactions by mixing alkoxides and/or other metal precursors such as acetates, β-diketonates or nitrates. Because the combination reactions are controlled by thermodynamics, however, the stoichiometry of the hetero-compound once isolated may not reflect the composition ratios in the mixture from which it was prepared. On the other hand, most metal alkoxides can be combined to produce hetero-metallic species that are often more soluble than the starting materials.

The solvent(s) used in MOD processing are selected based on a number of criteria including high solubility for the metal precursor compounds; chemical inertness to the metal precursor compounds; rheological compatibility with the deposition technique being used (e.g. the desired viscosity, wettability and/or compatibility with other rheology adjusters); boiling point; vapor pressure and rate of vaporization; and economic factors (e.g. cost, recoverability, toxicity, etc.).

Solvents that may be used in MOD processing include pentanes, hexanes, cyclohexanes, xylenes, ethyl acetates, toluene, benzenes, tetrahydrofuran, acetone, carbon disulfide, dichlorobenzenes, nitrobenzenes, pyridine, methyl alcohol, ethyl alcohol, butyl alcohol, chloroform and mineral spirits.

According to a preferred embodiment, nanoscale particles of metals or metal oxides can be formed on a high surface area iron oxide support. Suitable precursor compounds for the metal, metal oxide or iron oxide are those that thermally decompose at relatively low temperatures, such as discussed above. According to an embodiment, a metal precursor solution can be combined with a dispersion of iron oxide particles. The support can be commercially available particles, such as NANOCAT® iron oxide particles, or the support can be prepared from a colloidal solution or metal precursor solution as described above.

Nanoscale metal particles may be incorporated into the support by various methods, such as ion exchange, impregnation, or physical admixture. For example, the metal precursor may be dissolved or suspended in a liquid, and the high surface area support may be mixed with the liquid having the dispersed or suspended metal precursor. The dissolved or suspended metal precursor can be adsorbed onto a surface of the support or absorbed into the support. The metal precursor may also be deposited onto a surface of the support by removing the liquid, such as by evaporation so that the metal precursor remains on the support. The liquid may be substantially removed from the support during or prior to thermally treating the metal precursor, such as by heating the support at a temperature higher than the boiling point of the liquid or by reducing the pressure of the atmosphere surrounding the support.

Addition of the metal to molecular sieves, for example, can be accomplished through mixing the molecular sieves with a solution, preferably aqueous, of an appropriate metal precursor. The mixing can be performed at about ambient temperature or at elevated temperatures, e.g., through reflux. After incorporation of the metal precursor, but before heating, the metal precursor solution-molecular sieve mixture can optionally be filtered and washed with water.

Thermal treatment causes decomposition of the metal precursor to dissociate the constituent metal atoms, whereby the metal atoms may combine to form a nanoscale metal or metal oxide particle having an atomic ratio approximately equal to the stoichiometric ratio of the metal(s) in the metal precursor solution.

The thermal treatment can be carried out in various atmospheres. For instance, the support can be contacted with a metal precursor solution and the contacted support can be heated in an inert or reducing atmosphere to form activated nanoscale metal particles. Alternatively, the support can be contacted with a metal precursor solution and the contacted support can be heated in the presence of an oxidizing atmosphere and then heated in the substantial absence of an oxidizing atmosphere to form activated nanoscale metal oxide particles.

The metal precursor-contacted support is preferably heated to a temperature equal to or greater than the decomposition temperature of the metal precursor. The preferred heating temperature will depend on the particular ligands used as well as on the degradation temperature of the metal(s) and any other desired groups which are to remain. However, the preferred temperature is from about 200° C. to 400° C., for example 300° C. or 350° C. The heating of the metal precursor-contacted support can occur in an oxidizing and/or reducing atmosphere.

As an example, iron oxide particles smaller than 100 nm can be used as a support for nanoscale gold particles. The Au—$Fe_2O_3$ catalyst can be produced from gold hydroxide that is dissolved in alcohol and mixed with the iron oxide particles. Decomposition of the hydroxide into nanoscale gold particles, which can be intimately coated/mixed with the iron oxide particles, can be caused by heating the mixture to about 300 or 400° C. TEM images of nanometer scale gold particles supported on nanometer scale iron oxide particles are shown in FIGS. 1-4.

As a further example, nanoscale copper particles can be deposited on a high surface area substrate such as silica gel beads, activated carbon, molecular sieves, magnesia, alumina, silica, titania, zirconia, iron oxide, cobalt oxide, nickel oxide, copper oxide, yttria optionally doped with zirconium, manganese oxide optionally doped with palladium, ceria and mixtures thereof. For example, copper pentane dionate, copper oxalate, or other copper compounds that undergo low temperature decomposition can be combined with the substrate material, such as PICA carbon or silica gel beads, and heated to above the decomposition temperature of the precursor to deposit nanoscale copper particles on the substrate material.

Table 1 illustrates various examples. As shown in Table 1, metal precursor compounds, mixtures of metal precursor compounds and/or mixtures of nanoscale particles and metal precursor compounds were used to prepare nanoscale metal and/or metal oxide particles on high surface area supports. In each of the examples, a dispersion of the substrate material was combined with a solution containing the metal precursor compounds and/or nanoscale particles. In Examples 1-4, both silica gel and PICA carbon substrates were used. Example 5 was prepared on a porous silica gel substrate only. The mixtures were heated under flowing argon to a temperature of about 300-400° C. The product was nanoscale metal and/or metal oxide particles, typically ranging in size from about 300 to 500 nm, supported on the high surface area support particles. The cobalt oxide-iron oxide nanoscale particles of Example 4 were found to be magnetic.

TABLE 1

Preparation of nanoscale particles on high surface area supports

| Example | Precursor/powder mixture | Solvent | Nanoscale particles |
|---|---|---|---|
| 1 | copper pentane dionate zinc pentane dionate | chloroform | Cu + ZnO |
| 2 | copper pentane dionate | chloroform | Cu |
| 3 | copper pentane dionate (50 wt. %) cobalt pentane dionate (50 wt. %) | ethyl alcohol | Cu + CoO |
| 4 | cobalt pentane dionate iron pentane dionate | chloroform | CoO + iron oxide |
| 5 | CuO nanoscale powder zinc oxalate | chloroform | CuG + ZnO |

In general, a metal precursor and a support can be combined in any suitable ratio to give a desired loading of metal particles on the support. Gold hydroxide and iron oxide can be combined, for example, to produce from about 0.1 to 25% wt. %, e.g., 2 wt. %, 5 wt. %, or 15 wt. % gold on iron oxide.

The support may include substantially any material which, when heated to a temperature at which a metal precursor is converted to a metal on the surface thereof, does not melt, vaporize completely, or otherwise become incapable of supporting nanoscale particles.

During the conversion of CO to $CO_2$, the nanoscale particles and/or the high surface area support may become reduced. For example, $Fe_2O_3$, which may comprise the support or particles disposed on a support, may be reduced to $Fe_3O_4$, FeO or Fe during the reaction of CO to $CO_2$.

Iron oxide is a preferred constituent in the catalyst because is has a dual function as a CO or $NO_x$ catalyst in the presence of oxygen and as a CO oxidant for the direct oxidation of CO in the absence of oxygen. A catalyst that can also be used as an oxidant is especially useful for certain applications, such as within a burning cigarette where the partial pressure of oxygen can be very low.

A catalyst is capable of affecting the rate of a chemical reaction, e.g., increasing the rate of oxidation of carbon monoxide to carbon dioxide without participating as a reactant or product of the reaction. An oxidant is capable of oxidizing a reactant, e.g., by donating oxygen to the reactant, such that the oxidant itself is reduced.

Figure 5:
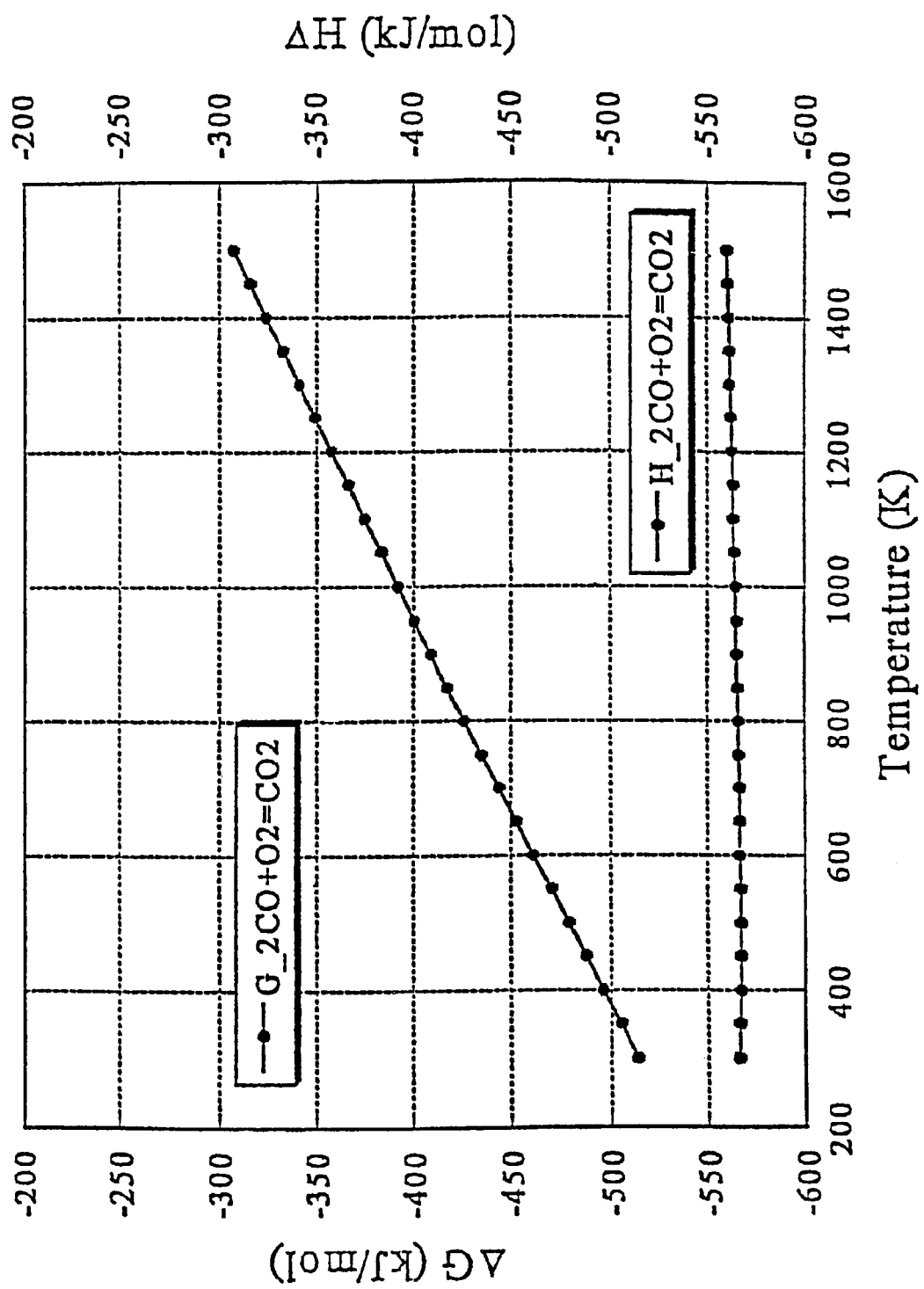
FIG. 5 depicts the temperature dependence of the Gibbs Free Energy and Enthalpy for the oxidation reaction of carbon monoxide to carbon dioxide.
Figure 6:
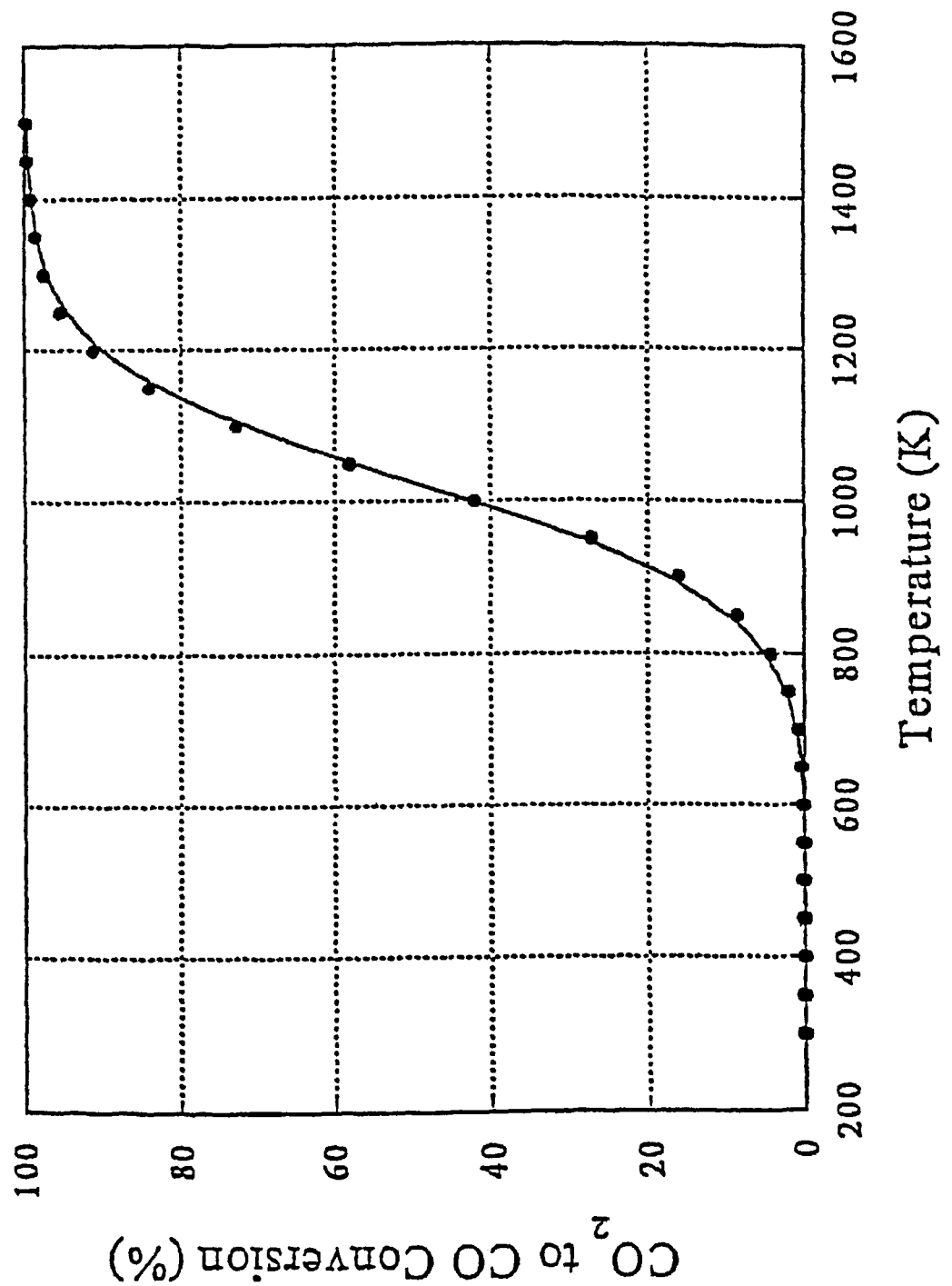
FIG. 6 depicts the temperature dependence of the percentage conversion of carbon dioxide to carbon monoxide.

In selecting a catalyst various thermodynamic considerations may be taken into account to ensure that catalysis will occur efficiently, as will be apparent to the skilled artisan. For example, FIG. 5 shows a thermodynamic analysis of the Gibbs Free Energy and Enthalpy temperature dependence for the oxidation of carbon monoxide to carbon dioxide. FIG. 6 shows the temperature dependence of the percentage of carbon dioxide conversion with carbon to form carbon monoxide.

Figure 7:
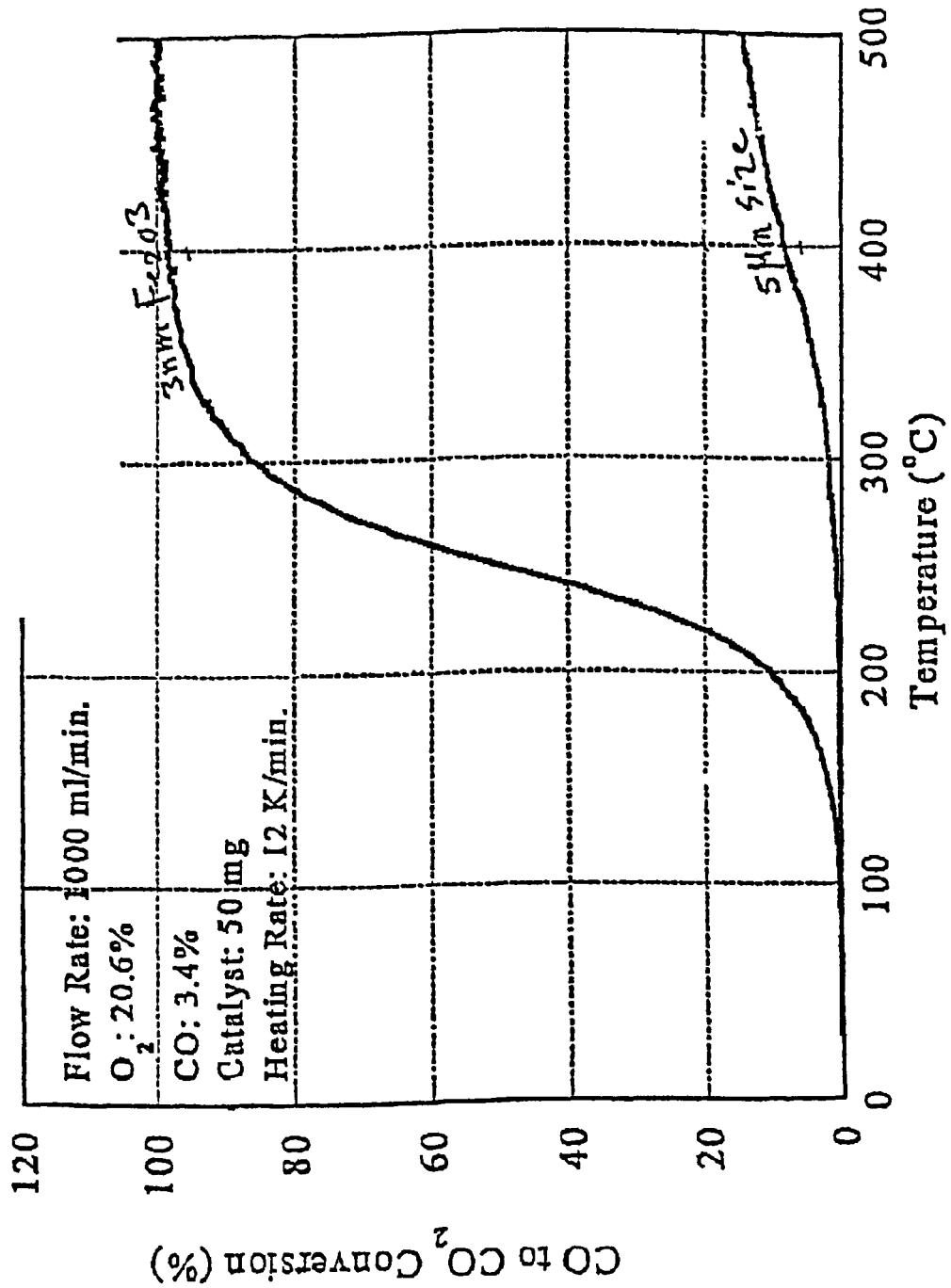
FIG. 7 depicts a comparison between the catalytic activity of $Fe_2O_3$ nanoscale particles (NANOCAT® Superfine Iron Oxide (SFIO) from MACH I, Inc., King of Prussia, Pa.) having an average particle size of about 3 nm, versus $Fe_2O_3$ powder (from Aldrich Chemical Company) having an average particle size of about 5 μm.

FIG. 7 shows a comparison between the catalytic activity of $Fe_2O_3$ nanoscale particles (NANOCAT® Superfine Iron Oxide (SFIO) from MACH I, Inc., King of Prussia, Pa.) having an average particle size of about 3 nm, versus $Fe_2O_3$ powder (from Aldrich Chemical Company) having an average particle size of about 5 μm. The $Fe_2O_3$ nanoscale particles show a much higher percentage of conversion of carbon monoxide to carbon dioxide than the larger $Fe_2O_3$ particles.

As mentioned above, $Fe_2O_3$ nanoscale particles are capable of acting as both an oxidant for the conversion of carbon monoxide to carbon dioxide and as a catalyst for the conversion of carbon monoxide to carbon dioxide. The $Fe_2O_3$ nanoscale particles can act as a catalyst for the conversion of carbon monoxide to carbon dioxide in the pyrolysis zone, and as an oxidant for the conversion of carbon monoxide to carbon dioxide in the combustion region.

Figure 8:
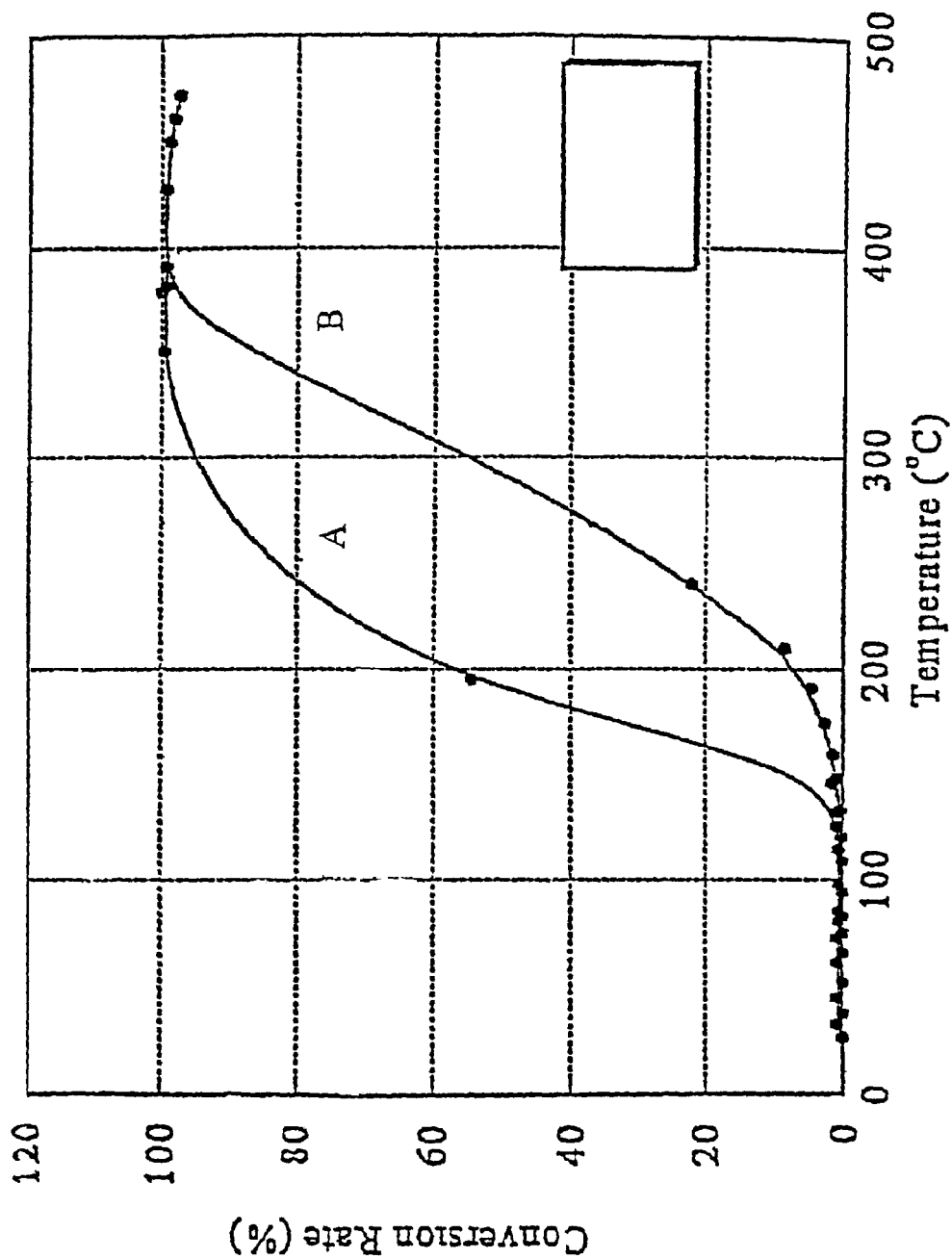
FIG. 8 depicts the temperature dependence for the conversion rates of CuO and $Fe_2O_3$ nanoscale particles as catalysts for the oxidation of carbon monoxide with oxygen to produce carbon dioxide.

To illustrate the effectiveness of nanoscale metal oxide, FIG. 8 illustrates a comparison between the temperature dependence of conversion rate for CuO (curve A) and $Fe_2O_3$ (curve B) nanoscale particles using 50 mg CuO particles and 50 mg $Fe_2O_3$ nanoscale particles as a catalyst in a quartz tube reactor. The gas (3.4% CO, 21% $O_2$, balance He) flow rate was 1000 ml/min. and the heating rate was 12.4 K/min. Although the CuO nanoscale particles have higher conversion rates at lower temperatures, at higher temperatures the CuO and $Fe_2O_3$ have comparable conversion rates.

Table 2 shows a comparison between the ratio of carbon monoxide to carbon dioxide, and the percentage of oxygen depletion when using CuO and $Fe_2O_3$ nanoscale particles.

TABLE 2

Comparison between CuO and $Fe_2O_3$ nanoscale particles

| Nanoscale particle | CO/$CO_2$ | $O_2$ Depletion (%) |
|---|---|---|
| None | 0.51 | 48 |
| CuO | 0.29 | 67 |
| $Fe_2O_3$ | 0.23 | 100 |

In the absence of nanoscale particles, the ratio of carbon monoxide to carbon dioxide is about 0.51 and the oxygen depletion is about 48%. The data in Table 2 illustrates the improvement obtained by using nanoscale particles. The ratio of carbon monoxide to carbon dioxide drops to 0.29 and 0.23 for CuO and $Fe_2O_3$ nanoscale particles, respectively. The oxygen depletion increases to 67% and 100% for CuO and $Fe_2O_3$ nanoscale particles, respectively.

The catalysts will preferably be distributed throughout the tobacco rod portion of a cigarette. By providing the catalysts throughout the tobacco rod, it is possible to reduce the amount of carbon monoxide drawn through the cigarette, and particularly in both the combustion region and in the pyrolysis zone.

The catalysts, as described above, may be provided along the length of a tobacco rod by distributing the catalyst on the tobacco or incorporating them into the cut filler tobacco using any suitable method. The catalysts may be provided in the form of a powder or in a solution in the form of a dispersion. Catalysts in the form of a dry powder can be dusted on the cut filler tobacco and/or cigarette filter material or the catalyst material can be added to the paper stock of a cigarette paper making machine. The catalysts may also be present in the form of a dispersion and sprayed on the cut filler tobacco, cigarette paper and/or cigarette filter material. Alternatively, the tobacco and/or cigarette filter material may be coated with a dispersion containing the catalysts. The catalyst may also be added to the cut filler tobacco stock supplied to the cigarette making machine or added to a tobacco column prior to wrapping cigarette paper around the tobacco column. The step of heating a mixture comprising a metal precursor solution to a temperature sufficient to thermally decompose the metal precursor into nanoscale particles is preferably performed prior to adding the catalyst to the cigarette.

The amount of the catalyst can be selected such that the amount of carbon monoxide in mainstream smoke is reduced during smoking of a cigarette. Preferably, the amount of the catalyst will be a catalytically effective amount, e.g., from about a few milligrams, for example, about 5 mg/cigarette, to about 200 mg/cigarette. More preferably, the amount of catalyst will be from about 10 mg/cigarette to about 100 mg/cigarette.

One embodiment provides a cut filler composition comprising tobacco and at least one catalyst that is capable of converting carbon monoxide to carbon dioxide, where the catalyst is in the form of a nanoscale metal particles and/or nanoscale metal oxide particles supported on a high surface area support.

Any suitable tobacco mixture may be used for the cut filler. Examples of suitable types of tobacco materials include flue-cured, Burley, Md. or Oriental tobaccos, the rare or specialty tobaccos, and blends thereof. The tobacco material can be provided in the form of tobacco lamina, processed tobacco materials such as volume expanded or puffed tobacco, processed tobacco stems such as cut-rolled or cut-puffed stems, reconstituted tobacco materials, or blends thereof. The tobacco can also include tobacco substitutes.

In cigarette manufacture, the tobacco is normally employed in the form of cut filler, i.e. in the form of shreds or strands cut into widths ranging from about 1/10 inch to about 1/20 inch or even 1/40 inch. The lengths of the strands range from between about 0.25 inches to about 3.0 inches. The cigarettes may further comprise one or more flavorants or other additives (e.g. burn additives, combustion modifying agents, coloring agents, binders, etc.) known in the art.

Another embodiment provides a cigarette comprising a tobacco rod, wherein the tobacco rod comprises tobacco cut filler having at least one catalyst, as described above, which is capable of converting carbon monoxide to carbon dioxide. A further embodiment provides a method of making a cigarette, comprising (i) adding a catalyst to a tobacco cut filler; (ii) providing the cut filler to a cigarette making machine to form a tobacco column; and (iii) placing a paper wrapper around the tobacco column to form the cigarette.

Techniques for cigarette manufacture are known in the art. Any conventional or modified cigarette making technique may be used to incorporate the catalysts. The resulting cigarettes can be manufactured to any known specifications using standard or modified cigarette making techniques and equipment. Typically, the cut filler composition is optionally combined with other cigarette additives, and provided to a cigarette making machine to produce a tobacco rod, which is then wrapped in cigarette paper, and optionally tipped with filters.

Cigarettes may range from about 50 mm to about 120 mm in length. Generally, a regular cigarette is about 70 mm long, a "King Size" is about 85 mm long, a "Super King Size" is about 100 mm long, and a "Long" is usually about 120 mm in length. The circumference is from about 15 mm to about 30 mm in circumference, and preferably around 25 mm. The tobacco packing density is typically between the range of about 100 mg/cm$^3$ to about 300 mg/cm$^3$, and preferably 150 mg/cm$^3$ to about 275 mg/cm$^3$.

Yet another embodiment provides a method of smoking the cigarette described above, which involves lighting the cigarette to form smoke and drawing the smoke through the cigarette, wherein during the smoking of the cigarette, the catalyst acts as a catalyst for the conversion of carbon monoxide to carbon dioxide.

While the invention has been described with reference to preferred embodiments, it is to be understood that variations and modifications may be resorted to as will be apparent to those skilled in the art. Such variations and modifications are to be considered within the purview and scope of the invention as defined by the claims appended hereto.

What is claimed is:

1. A method of making a cigarette, comprising:
   (i) adding a catalyst to tobacco cut filler, cigarette paper and/or a cigarette filter, wherein the catalyst comprises nanoscale metal particles and/or nanoscale metal oxide particles supported on high surface area support particles;
   (ii) providing the cut filler to a cigarette making machine to form a tobacco column;
   (iii) placing a paper wrapper around the tobacco column to form a tobacco rod; and
   (iv) attaching the filter to the tobacco rod to form the cigarette,
   wherein the nanoscale metal and/or metal oxide particles include a metal selected from the group consisting of B, Mg, Si, Ti, Fe, Co, Ni, Zn, Ge, Zr, Nb, Mo, Ru, Rh, Ag, Sn, Hf, Ta, W, Re, Os, Ir, Pt and mixtures thereof,
   further comprising forming the catalyst by:
   combining a metal precursor and a solvent to form a metal precursor solution;
   combining the metal precursor solution with a dispersion of nanoscale high surface area support particles to form a mixture; and
   heating the mixture to a temperature sufficient to thermally decompose the metal precursor to form nanoscale particles within and/or on the high surface area support,
   wherein the high surface area support particles are selected from the group consisting of iron oxide, cobalt oxide, nickel oxide, copper oxide, yttria, manganese oxide optionally doped with palladium and mixtures thereof.

2. The method of claim 1, wherein the nanoscale high surface area support particles have an average diameter of less than about 7 nm.

3. The method of claim 1, wherein the formed nanoscale particles are located within cavities or pores of the high surface area support particles.

4. A method of making a cigarette, comprising:
   (i) adding a catalyst to tobacco cut filler, cigarette paper and/or a cigarette filter, wherein the catalyst comprises nanoscale metal particles and/or nanoscale metal oxide particles supported on high surface area support particles;
   (ii) providing the cut filler to a cigarette making machine to form a tobacco column;
   (iii) placing a paper wrapper around the tobacco column to form a tobacco rod; and
   (iv) attaching the filter to the tobacco rod to form the cigarette,
   wherein the nanoscale metal and/or metal oxide particles include a metal selected from the group consisting of B, Mg, Al, Si, Ti, Fe, Co, Ni, Zn, Ge, Zr, Nb, Mo, Ru, Rh, Pd, Ag, Sn, Hf, Ta, W, Re, Os, Ir, Pt and Au and mixtures thereof,
   further comprising forming the catalyst by:
   combining a metal precursor and a solvent to form a metal precursor solution;
   combining the metal precursor solution with a colloidal solution of high surface area support particles to form a mixture; and
   heating the mixture to a temperature sufficient to thermally decompose the metal precursor to form nanoscale particles within and/or on the high surface area support,
   wherein the high surface area support particles are selected from the group consisting of magnesia, titania, yttria and/or zirconia.

5. The method of claim 4, wherein the viscosity of the colloidal solution is increased to form a gel before the step of heating the mixture.

6. The method of claim 5, wherein the gel is washed before the step of heating the mixture.

7. The method of claim 5, wherein the step of increasing the viscosity of the colloidal solution comprises varying the pH of the mixture.

8. The method of claim 5, wherein the step of increasing the viscosity of the colloidal solution comprises adding an acid or a base to the mixture.

9. The method of claim 8, wherein the acid is HCl.

10. The method of claim 4, wherein the concentration of colloids in the colloidal solution is from about 10 to 60 weight percent.

11. A method of making a cigarette, comprising:
    (i) adding a catalyst to tobacco cut filler, cigarette paper and/or a cigarette filter, wherein the catalyst comprises nanoscale metal particles and/or nanoscale metal oxide particles supported on high surface area support particles;

(ii) providing the cut filler to a cigarette making machine to form a tobacco column;
(iii) placing a paper wrapper around the tobacco column to form a tobacco rod; and
(iv) attaching the filter to the tobacco rod to form the cigarette,
wherein the nanoscale metal and/or metal oxide particles include a metal selected from the group consisting of B, Mg, Al, Si, Ti, Fe, Co, Ni, Zn, Ge, Zr, Nb, Mo, Ru, Rh, Pd, Ag, Sn, Hf, Ta, W, Re, Os, Ir, Pt and Au and mixtures thereof,
further comprising forming the catalyst by:
combining a metal precursor and a solvent to form a metal precursor solution, wherein the metal precursor is selected from the group consisting of 1,3-diketonates, dionates, oxalates and hydroxides is combined with the solvent;
combining the metal precursor solution with high surface area support particles to form a mixture; and
heating the mixture to a temperature sufficient to thermally decompose the metal precursor to form nanoscale particles within and/or on the high surface area support,
wherein the high surface area support particles are selected from the group consisting of iron oxide, cobalt oxide, nickel oxide, copper oxide, yttria, manganese oxide optionally doped with palladium, ceria and mixtures thereof.

12. A method of making a cigarette, comprising:
(i) adding a catalyst to tobacco cut filler, cigarette paper and/or a cigarette filter, wherein the catalyst comprises nanoscale metal particles and/or nanoscale metal oxide particles supported on high surface area support particles;
(ii) providing the cut filler to a cigarette making machine to form a tobacco column;
(iii) placing a paper wrapper around the tobacco column to form a tobacco rod; and
(iv) attaching the filter to the tobacco rod to form the cigarette,
wherein the nanoscale metal and/or metal oxide particles include a metal selected from the group consisting of B, Mg, Al, Si, Ti, Fe, Co, Ni, Zn, Ge, Zr, Nb, Mo, Ru, Rh, Pd, Ag, Sn, Hf, Ta, W, Re, Os, Ir, Pt and Au and mixtures thereof,
further comprising forming the catalyst by:
combining a metal precursor and a solvent to form a metal precursor solution;
combining the metal precursor solution with colloidal high surface area support particles to form a mixture; and
heating the mixture to a temperature sufficient to thermally decompose the metal precursor to form nanoscale particles within and/or on the high surface area support, wherein the mixture is heated to a temperature of from about 200 to 400° C., and
wherein the high surface area support particles are selected from the group consisting of iron oxide, cobalt oxide, nickel oxide, copper oxide, yttria, manganese oxide optionally doped with palladium, ceria and mixtures thereof.

13. A method of making a cigarette, comprising:
(i) adding a catalyst to tobacco cut filler, cigarette paper and/or a cigarette filter, wherein the catalyst comprises nanoscale metal particles and/or nanoscale metal oxide particles supported on high surface area support particles;
(ii) providing the cut filler to a cigarette making machine to form a tobacco column;
(iii) placing a paper wrapper around the tobacco column to form a tobacco rod; and
(iv) attaching the filter to the tobacco rod to form the cigarette,
wherein the nanoscale metal and/or metal oxide particles include a metal selected from the group consisting of B, Mg, Si, Ti, Fe, Co, Ni, Zn, Ge, Zr, Nb, Mo, Ru, Rh, Ag, Sn, Hf, Ta, W, Re, Os, Ir, Pt and mixtures thereof,
further comprising forming the catalyst by:
combining a metal precursor and a solvent to form a metal precursor solution;
combining the metal precursor solution with high surface area support particles to form a mixture; and
heating the mixture to a temperature sufficient to thermally decompose the metal precursor to form nanoscale particles within and/or on the high surface area support,
wherein the high surface area support particles comprising submicron and/or nanoscale particles are combined with the metal precursor solution, and
wherein the high surface area support particles are selected from the group consisting of iron oxide, cobalt oxide, nickel oxide, copper oxide, yttria, manganese oxide optionally doped with palladium, ceria and mixtures thereof.

14. A method of making a cigarette, comprising:
(i) adding a catalyst to tobacco cut filler, cigarette paper and/or a cigarette filter, wherein the catalyst comprises nanoscale metal particles and/or nanoscale metal oxide particles supported on high surface area support particles;
(ii) providing the cut filler to a cigarette making machine to form a tobacco column;
(iii) placing a paper wrapper around the tobacco column to form a tobacco rod; and
(iv) attaching the filter to the tobacco rod to form the cigarette,
wherein the nanoscale metal and/or metal oxide particles include a metal selected from the group consisting of B, Mg, Al, Si, Ti, Fe, Co, Ni, Zn, Ge, Zr, Nb, Mo, Ru, Rh, Pd, Ag, Sn, Hf, Ta, W, Re, Os, Ir, Pt and Au and mixtures thereof,
further comprising forming the catalyst by:
combining a metal precursor and a solvent to form a metal precursor solution;
combining the metal precursor solution with high surface area support particles to form a mixture; and
heating the mixture to a temperature sufficient to thermally decompose the metal precursor to form nanoscale particles within and/or on the high surface area support,
wherein the nanoscale metal particles further comprise carbon from partial decomposition of the metal precursor and/or solvent, and
wherein the high surface area support particles are selected from the group consisting of iron oxide, cobalt oxide, nickel oxide, copper oxide, yttria, manganese oxide optionally doped with palladium, ceria and mixtures thereof.

15. The method of claim 4, wherein the metal precursor solution comprises a metal selected from the group consisting of Zn, Co and/or Fe.

16. A method of making a cigarette, comprising:
(i) adding a catalyst to tobacco cut filler, cigarette paper and/or a cigarette filter, wherein the catalyst comprises nanoscale metal particles and/or nanoscale metal oxide particles supported on high surface area support particles;

(ii) providing the cut filler to a cigarette making machine to form a tobacco column;

(iii) placing a paper wrapper around the tobacco column to form a tobacco rod; and (iv) attaching the filter to the tobacco rod to form the cigarette, wherein the nanoscale metal and/or metal oxide particles include a metal selected from the group consisting of B, Mg, Al, Si, Ti, Fe, Co, Ni, Zn, Ge, Zr, Nb, Mo, Ru, Rh, Pd, Ag, Sn, Hf, Ta, W, Re, Os, Ir, Pt and Au and mixtures thereof, further comprising forming the catalyst by:

combining a metal precursor and a solvent to form a metal precursor solution, wherein the metal precursor selected from the group consisting of 1,3-diketonates and dionates is combined with the solvent;

combining the metal precursor solution with high surface area support particles to form a mixture; and heating the mixture to a temperature sufficient to thermally decompose the metal precursor to form nanoscale particles within and/or on the high surface area support, wherein the high surface area support particles are selected from the group consisting of magnesia, alumina, titania, zirconia, iron oxide, cobalt oxide, nickel oxide, copper oxide, yttria optionally doped with zirconium, manganese oxide optionally doped with palladium, ceria, activated carbon and mixtures thereof.

17. The method of claim 1, wherein the solvent is selected from the group consisting of pentanes, hexanes, cyclohexanes, xylenes, ethyl acetates, toluene, benzenes, tetrahydrofuran, acetone, carbon disulfide, dichlorobenzenes, nitrobenzenes, pyridine, methyl alcohol, ethyl alcohol, butyl alcohol, chloroform and mineral spirits.

18. The method of claim 4, wherein the solvent is selected from the group consisting of pentanes, hexanes, cyclohexanes, xylenes, ethyl acetates, toluene, benzenes, tetrahydrofuran, acetone, carbon disulfide, dichlorobenzenes, nitrobenzenes, pyridine, methyl alcohol, ethyl alcohol, butyl alcohol, chloroform and mineral spirits.

19. The method of claim 11, wherein the solvent is selected from the group consisting of pentanes, hexanes, cyclohexanes, xylenes, ethyl acetates, toluene, benzenes, tetrahydrofuran, acetone, carbon disulfide, dichlorobenzenes, nitrobenzenes, pyridine, methyl alcohol, ethyl alcohol, butyl alcohol, chloroform and mineral spirits.

20. The method of claim 12, wherein the solvent is selected from the group consisting of pentanes, hexanes, cyclohexanes, xylenes, ethyl acetates, toluene, benzenes, tetrahydrofuran, acetone, carbon disulfide, dichlorobenzenes, nitrobenzenes, pyridine, methyl alcohol, ethyl alcohol, butyl alcohol, chloroform and mineral spirits.

21. The method of claim 13, wherein the solvent is selected from the group consisting of pentanes, hexanes, cyclohexanes, xylenes, ethyl acetates, toluene, benzenes, tetrahydrofuran, acetone, carbon disulfide, dichlorobenzenes, nitrobenzenes, pyridine, methyl alcohol, ethyl alcohol, butyl alcohol, chloroform and mineral spirits.

22. The method of claim 14, wherein the solvent is selected from the group consisting of pentanes, hexanes, cyclohexanes, xylenes, ethyl acetates, toluene, benzenes, tetrahydrofuran, acetone, carbon disulfide, dichlorobenzenes, nitrobenzenes, pyridine, methyl alcohol, ethyl alcohol, butyl alcohol, chloroform and mineral spirits.

23. The method of claim 16, wherein the solvent is selected from the group consisting of pentanes, hexanes, cyclohexanes, xylenes, ethyl acetates, toluene, benzenes, tetrahydrofuran, acetone, carbon disulfide, dichlorobenzenes, nitrobenzenes, pyridine, methyl alcohol, ethyl alcohol, butyl alcohol, chloroform and mineral spirits.

\* \* \* \* \*